(12) United States Patent
Cutting et al.

(10) Patent No.: US 9,047,346 B2
(45) Date of Patent: Jun. 2, 2015

(54) REPORTING LANGUAGE FILTERING AND MAPPING TO DIMENSIONAL CONCEPTS

(75) Inventors: Jeffrey B. Cutting, Aurora, CO (US); Eric C. Peterson, Parker, CO (US); Daniel V. Barnett, Centennial, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1051 days.

(21) Appl. No.: 12/269,035

(22) Filed: Nov. 11, 2008

(65) Prior Publication Data

US 2010/0121883 A1  May 13, 2010

(51) Int. Cl.
*G06F 7/00* (2006.01)
*G06F 17/30* (2006.01)

(52) U.S. Cl.
CPC .............................. *G06F 17/30539* (2013.01)

(58) Field of Classification Search
USPC .................. 707/791, 797, 802; 715/205, 764
See application file for complete search history.

(56) References Cited

U.S. PATENT DOCUMENTS

| | | | |
|---|---|---|---|
| 7,373,341 B2 * | 5/2008 | Polo-Malouvier ..... | 707/999.002 |
| 7,822,769 B2 * | 10/2010 | Rohan et al. .................. | 707/777 |
| 2005/0182777 A1 | 8/2005 | Block et al. | |
| 2006/0230025 A1 * | 10/2006 | Baelen .............................. | 707/3 |
| 2007/0078877 A1 | 4/2007 | Ungar et al. | |
| 2007/0136352 A1 * | 6/2007 | Chape et al. .................. | 707/102 |
| 2008/0059482 A1 | 3/2008 | Rohan et al. | |
| 2008/0282139 A1 * | 11/2008 | Davis ............................ | 715/205 |
| 2009/0064040 A1 * | 3/2009 | Wolf et al. ........................ | 707/3 |

OTHER PUBLICATIONS

"Audit & Control Implications of XBRL", Information Technology Advisory Committee of The Canadian Institute of Chartered Accountants, 2002, 15 Pages, Toronto, Canada.
"Dimensions Modeler", Snappy Reports XBRL, webpage available at <<http://www.snappyreports.com/DimensionsModeler.html>>, last accessed Sep. 15, 2008, 2 pages.
Ignacio Hernandez-Ros, et al., "XBRL Dimensions 1.0", Recommendation, XBRL International Inc., webpage available at <<http://www.xbrl.org/Specification/XDT-REC-2006-09-18.htm>>, Sep. 18, 2006, last accessed Sep. 15, 2008, 36 pages.
Vasal, et al., "eXtensible Business Reporting Language (XBRL)—The Digital Language of Business: An Indian Perspective", Indian Accounting Review, Jun. 2002, pp. 41-59, vol. 6, No. 1.
Ramin, et al., "Building an IAS/IFRS Taxonomy Using XBRL", A New Language for Corporate Reporting, Mar. 30, 2004, 8 pages.

* cited by examiner

*Primary Examiner* — Hosain Alam
*Assistant Examiner* — Jieying Tang
(74) *Attorney, Agent, or Firm* — Thomas Wong; Aaron Hoff; Micky Minhas

(57) ABSTRACT

Architecture that translates a complex dimensional hierarchy (e.g., XBRL) into an understandable member picker which removes the complexities that the user would otherwise have to face. Using a building block metaphor, the architecture provides element and dimension tagging. The building blocks can include rows, columns, and optional trees. Building blocks are selected and grouped into a report definition, which definition is utilized to retrieve and process basis data into fact data in the final reports. The reporter mechanism removes the complexities in both the XBRL standard and XML, and ensures that the user associates the information appropriately within the report definition. The architecture extends the building block metaphor to include dimension tagging. A portion of the information from each building block is used to produce a fully qualified dimension context and logical validation is performed to ensure accuracy.

20 Claims, 13 Drawing Sheets

DIMENSIONS DIALOG

ROW DEFINITION TO DISPLAY ASSOCIATED DIMENSIONS:

NEW ROW DEFINITION

DISPLAY LABELS IN:

ENGLISH (UNITED STATES)

DIMENSIONS AND VALUES:

| DIMENSION | VALUE |
|---|---|
| | |

DIMENSIONS NOT DEFINED IN THE REPORTING TREE DEFINITION MUST BE DEFINED IN THE COLUMN DEFINITION.

OK   CANCEL

FIG. 4

REPORTING LANGUAGE FILTERING AND MAPPING TO DIMENSIONAL CONCEPTS

BACKGROUND

Enterprise resource planning (ERP) systems enable various types of reporting across a variety of different enterprise systems. In some cases, ERP systems may be used to report financial information within the enterprise. However, in some cases, this financial information may be incomplete or not fully organized, thereby complicating the process of searching this financial information, and extracting relevant reports.

With the approval of the latest XBRL (extensible business reporting language) specifications, dimension-based concepts are valid identification mechanisms which should be related to fact data provided in the resulting report. The specification, as well as the XML (extensible markup language) schema for these dimensional hypercubes is very detailed and confusing, which allows for a high probability that an XBRL statement preparer will incorrectly tag the financial information.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a reporter mechanism that translates a complex dimensional hierarchy of a reporting language into an understandable member picker which removes the complexities that the user would otherwise have to face. Using a building block metaphor, the architecture provides element and dimension tagging.

In the context of business data such as financial data, for example, building blocks can be rows (which usually define account information), columns (which usually define book codes and reporting periods) and optional trees (which define departmental structure for a report). Building blocks are selected and grouped into a report definition, which definition is utilized to retrieve and process basis data into fact data in the final reports.

The architecture includes dimension parsing, presentation, tagging, and instance document creation mechanisms that are complex, but this complexity is hidden from the end user so that the end user can interact more intuitively to obtain the desired result. The reporter mechanism extends the building block metaphor to include this dimension tagging. A portion of the information from each building block is used to produce a fully qualified dimension context and logical validation is performed to ensure accuracy.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 4 illustrates a screenshot of an exemplary dimension dialog.

DETAILED DESCRIPTION

Figure 1:
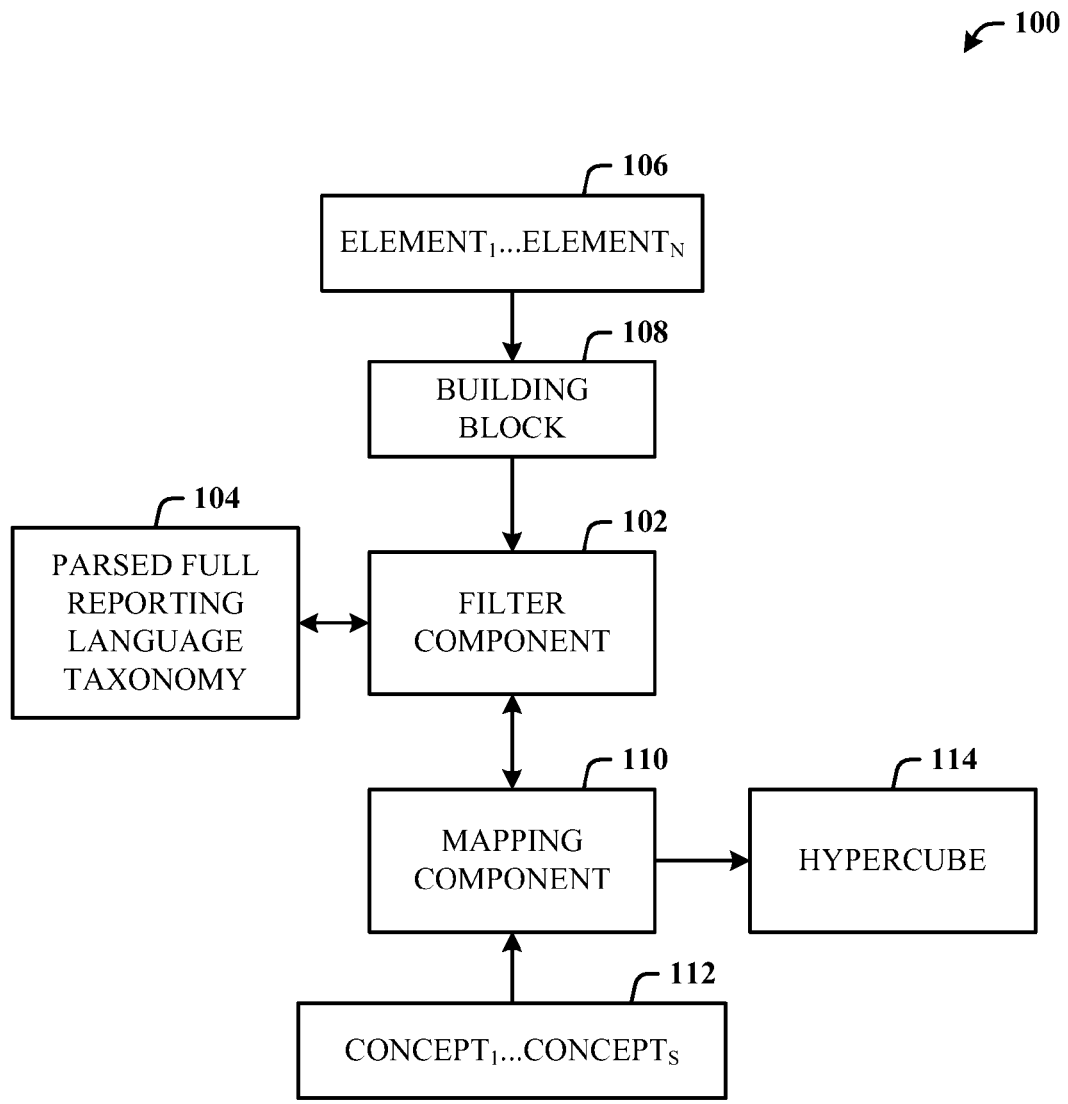
FIG. 1 illustrates a computer-implemented reporting system in accordance with the disclosed architecture.

The disclosed architecture includes a reporter mechanism that translates a complex reporting language taxonomy (e.g., XBRL (extensible business reporting language)) into an understandable member picker. Using a building block metaphor, the architecture provides dimension tagging. In the context of business data such as financial data, for example, building blocks can be rows (which usually define account information), columns (which usually define book codes and reporting periods) and optional trees (which define departmental structure for a report). Building blocks are selected and grouped into a report definition, which definition is utilized to retrieve and process basis data into fact data in the final reports (instance documents). It is to be understood, however, that the disclosed architecture is not restricted to financial data, but can be applied to other business data as well.

Fact data is intended to mean the resulting data generated by processing all basis data initially input into computation to produce the final output report (instance document). In other words, the fact data is the data presented in the final report, whereas the basis data is that which is processed to generate the fact data. As applied to XBRL, for example, the reporter mechanism removes the complexities in both the XBRL standard and XML, and ensures that the user associates the information appropriately within the report definition.

The architecture combines building blocks to produce reports. In the context of business data such as financial data, building blocks are rows (which usually define account information), columns (which usually define book codes and reporting periods) and optional trees (which define departmental structure for a report). When the building blocks are selected within a report definition, the user has the ability to define footnotes and relate the footnotes to specific row(s), column(s), and optionally, tree intersections. When the report is generated, these intersections equate to specific data facts.

The reporter mechanism extends the building block metaphor to include this dimension tagging. A portion of the information from each building block is used to produce a fully qualified dimension context and logical validation is performed to ensure accuracy.

In the context of a financial reporting system, the reusable building blocks allow the user to define the financial statements and disclosures, for example, only once. The description as applied to each is intended to cover both statements and disclosures, and other reports, as desired. The user can then simply repeat the report generation at the desired time (e.g., every month). The user is no longer required to redefine the report for each desired reporting period. The user does not need to define the actual financial facts—only where to get the facts. When the user initiates report regeneration, the architecture dynamically determines what information is to be retrieved, where to get the information, and then retrieves it.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented reporting system 100 in accordance with the disclosed architecture. The system 100 can include a filter component 102 for filtering a parsed full reporting language taxonomy 104 based on reporting language elements 106 assigned in a building block 108 (e.g., a row building block). A mapping component 110 can be provided for mapping the parsed reporting language elements 106 to dimension concepts 112. Ultimately, a hypercube 114 can be generated that is a complete rendering of properly validated building blocks, elements (e.g., labels), and dimension concepts.

The filter component 102 dynamically filters the reporting language elements 106 based on a data type in the building block 108. The building block 108 can be a row building block. It is to be understood that a row building block can contain rows of many types (not just one type for the entire row building block), and that the selection dialog can be filtered to include items of the type for the current row in the row building block. For example, row 1 may be numeric, so all non-numeric items are filtered when the user opens the selection dialog for row 1. However, row 2 may be text, so when the user opens the selection dialog for row 2, only text items will be displayed.

In this case of the building block 108 being a row building block, the mapping component 110 facilitates the association of a column building block to the row building block. The mapping component 110 also facilitates the association of a tree building block to the row building block. The mapping component 110 includes a dimension dialog for assigning a dimension concept (of the dimension concepts 112) to a reporting language element (of the reporting language elements 106). The filter component 102 and the mapping component 110 facilitate creation of the hypercube 114 that is presented with row building blocks and possible values for the associated dimension concepts 112. The filter component 102 can include a presentation dialog for presenting the filtered reporting language elements 106 as a hierarchy of the reporting language taxonomy.

Figure 2:
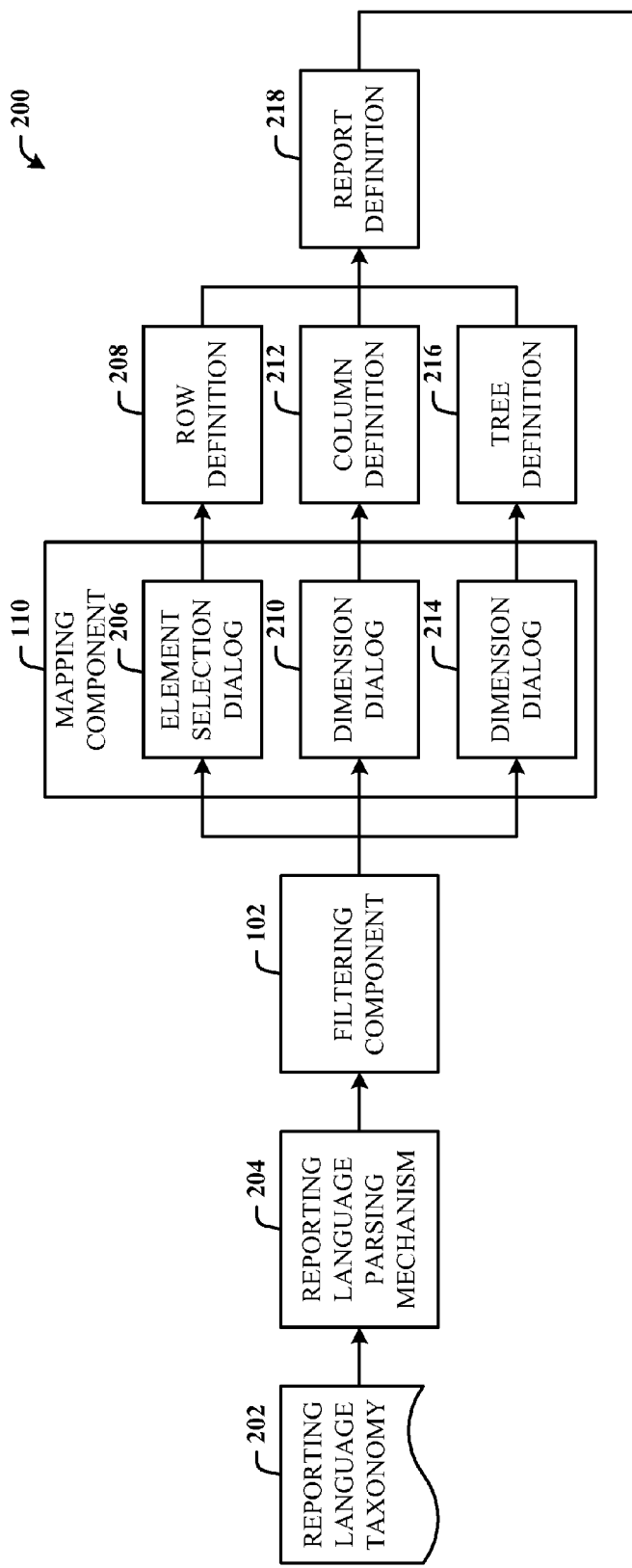
FIG. 2 illustrates a more detailed embodiment of a reporting system.
Figure 2:
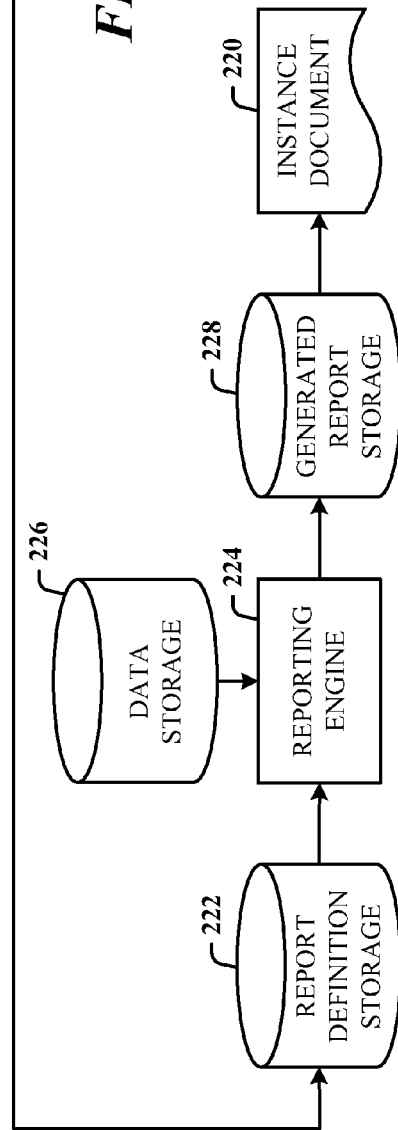

FIG. 2 illustrates a more detailed embodiment of a reporting system 200. The system 200 facilitates the processing of parsing, presentation, tagging, and instance document creation within a reporter architecture, where the processing is extremely complex; however, this complexity is hidden from the end user. The reporting architecture utilizes a building block metaphor that includes a reporting language (e.g., XBRL) dimension tagging. A portion of the information from each building block is used to produce a fully qualified language dimension context and performs logical validation to ensure accuracy.

The system 200 accesses a full reporting language taxonomy 202 and parses the full taxonomy using a parser 204 (also referred to as reporting language parsing mechanism 204). The filtering component 102, as described above, reacts to user input related to reporting language element selection (via an element selection dialog 206) for a row definition 208 by automatically filtering out irrelevant elements (e.g., labels) and presenting only relevant elements. Similarly, filtering is performed by the filtering component 102 related to a dimension dialog 210 for a column definition 212 and a dimension dialog 214 for a tree definition 216.

The row definition (building block) 208, column definition 212, and optionally, the tree definition 216 are included in a report definition 218 that services as the basis for creating an instance document 220 (also referred to as an output report). The instance document 220 stores at least the element and the element namespace as identifiers. In the context of a financial implementation, for example, the instance document can be a financial statement or financial disclosure, for example. Note that the element selection dialog 206, dimension dialog 210 for columns and dimension dialog 214 for trees are represented as part of the mapping component 110. The dialogs are presented for user interaction and mapping of the associated elements to the desired definition entities.

Once the report definition 218 has been completed, the report definition 218 can be stored in a report definition storage 222. Multiple different report definitions can be stored in the definition storage 222 such that the user (or automatic definition consuming mechanisms) can select a report definition via a reporting engine 224, and initiate processing of the selected report definition to output the instance document 220. The reporting engine 224 processes the selected report definition (e.g., report definition 218), accesses data (e.g., business data such as financials) from a data storage 226, and processes the data into fact data for storage in a generated report storage 228.

In other words, the user begins by linking to a valid reporting language taxonomy 202 (e.g., XBRL) via a network address or an "http" address. Once the taxonomy is identified, the system 200 parses the taxonomy identifying regular reporting language elements as well as dimension concepts. This complicated function determines hypercube hierarchy, regular reporting language elements, and presentation hierarchy. This function also predefines reporting language association rules used to produce a valid instance document 220. Once the taxonomy is parsed, the user can then add a new link type within the row definition linking. Thereafter, the user has the ability to tag financial data types defined in the row structure with reporting language elements. When the reporting language elements that are associated with hypercubes are selected, dimensional functionality and validation are triggered within the rest of the system. The user can use reporting language elements from one or multiple hypercubes within a single row definition.

Figure 3:
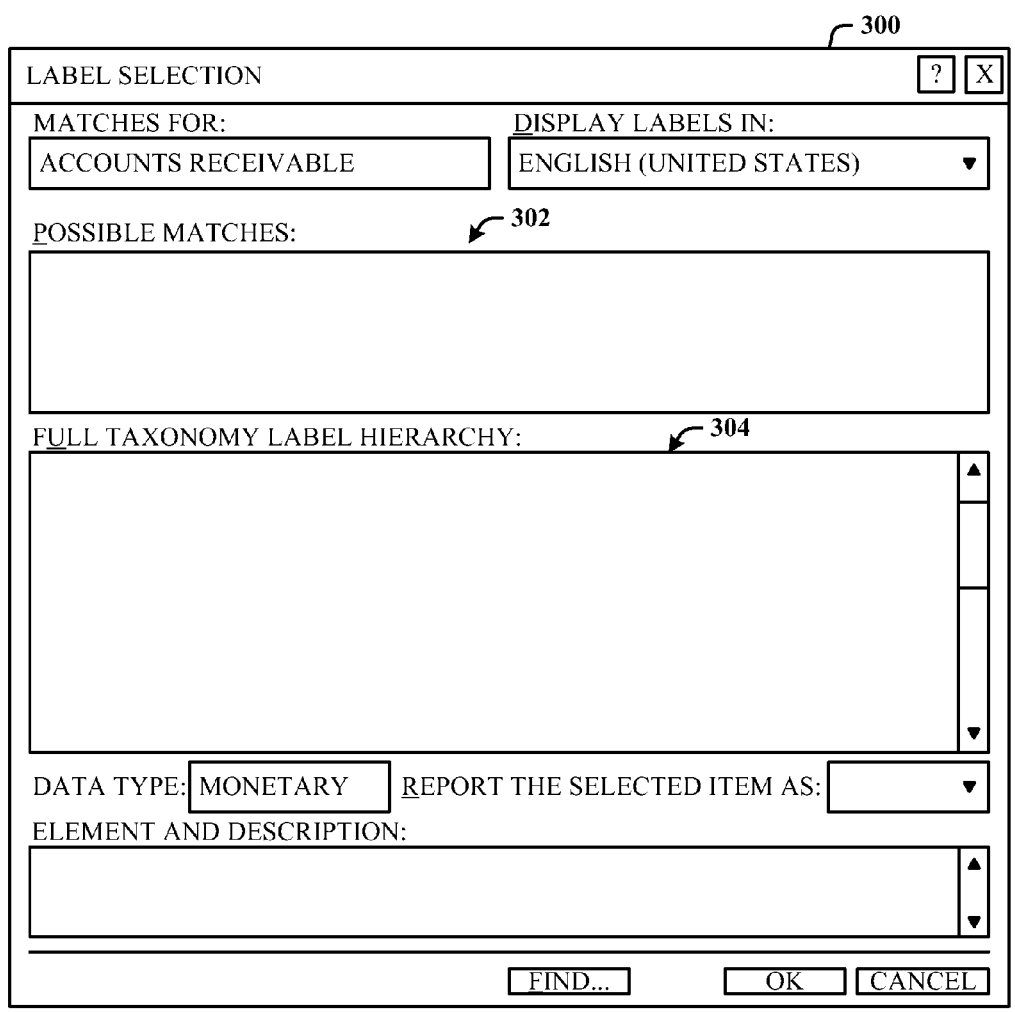
FIG. 3 illustrates a screenshot of an exemplary reporting language element selection dialog.

FIG. 3 illustrates a screenshot of an exemplary reporting language element selection dialog 300 (similar to the element selection dialog 206 of FIG. 2). Here, in the context of a financial implementation, the user searches the parsed reporting language taxonomy (e.g., a business reporting taxonomy) for Accounts Receivable labels. The Accounts Receivable can be part of the row definition. The filter component automatically filters out labels unrelated to the Accounts Receivable query and presents only possible related matches 302, and in the context of a full taxonomy label hierarchy 304. The data type for the Accounts Receivable is indicated as Monetary, and thus, only monetary data types will be selected. In other words, if the user is in a numeric row, other data item types such as text, date/time, Boolean, etc., are filtered out, and only numeric items are offered up in the selection dialog 300. This is accomplished as the display hierarchy is built by checking each reporting language element item type and only adding the element to the tree if the item type is of the desired data type.

FIG. 4 illustrates a screenshot of an exemplary dimensions dialog 400 (similar to the dimension dialogs 210 and 214 of FIG. 2). With reporting language elements defined in the row definition (or building block), the user can now complete the hypercube by selecting dimension values for column definitions and optionally, tree definitions. To accomplish this, a user is presented with the reporting language dimensions dialog 400 which allows the user to link back to the appropriate row definition where the reporting language elements are defined.

A grid displays the hypercubes with which the row labels are associated, along with the dimensions for the hypercube. Only dimension concepts associated with the selected row definition (depicted as New Row Definition) are presented and any item indented in the Dimension column can have an associated Value. An alternative to indentation can be the use of icons or some other designation to indicate hypercubes and the hypercube dimensions. The presentation of only valid members in this functionality ensures that the user is defining appropriate elements (e.g., labels) against appropriate dimensions. If a member is chosen for a dimension that is repeated within the available dimensions, the selected member is entered in each instance of that dimension.

Once the building blocks are appropriately tagged, the building blocks are combined into a report definition. When the report definition is generated, an analysis is performed that ensures that all reporting language dimension concepts are dimensionally valid for the associated hypercubes based on the concepts chosen in the row definition and the dimensions defined in the column/tree. If the dimension is not well formed, the user can be notified. If the dimension is well formed, the dimension is added to the reporting language context related to the fact data for that row. All building blocks and associated reporting language elements are interchangeable and reusable within the context of disclosed reporting architecture.

It is also within contemplation of the disclosed architecture that dimensions can be selected in the row building block. In other words, generally, selection can be applied to any building block. For example, the selection of dimensions in the report building block can be obtained with the filters using some or combined information from row, column, and tree building blocks.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 5:
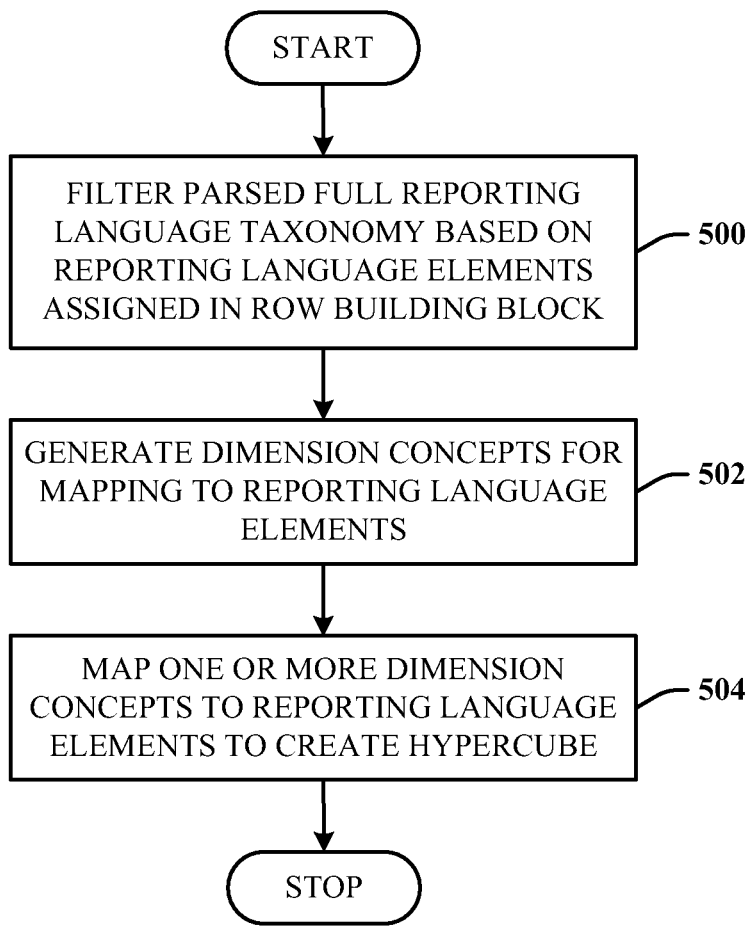
FIG. 5 illustrates a method of generating a report.

FIG. 5 illustrates a method of generating a report. At 500, a parsed full reporting language taxonomy is filtered based on reporting language elements assigned in a row building block. At 502, dimension concepts are generated for mapping to the reporting language elements. At 504, one or more dimension concepts are mapped to the reporting language elements to create a hypercube.

The method can further comprise generating a hypercube based on the mapping of a column building block, and optionally, a tree building block, to the row building block. The method can further comprise validating the hypercube by ensuring that the mapped dimension concepts are valid for the reporting language elements of the row building block. The parsed full reporting language taxonomy is filtered based on data type of reporting language element assigned in the row building block. As previously described, a row building block can contain rows of many types (not just one type for the entire row building block), and that the selection dialog can be filtered to include items of the type for the current row in the row building block.

The method can further comprise storing a selected reporting language element, element namespace, and presentation link in a location of the selected reporting language element, and presenting a list of hypercubes for corresponding reporting language elements. Note that alternatively, the relationships in the taxonomy can be used to retrieve the hypercubes associated with the items from the row building block, instead of the link.

Figure 6:
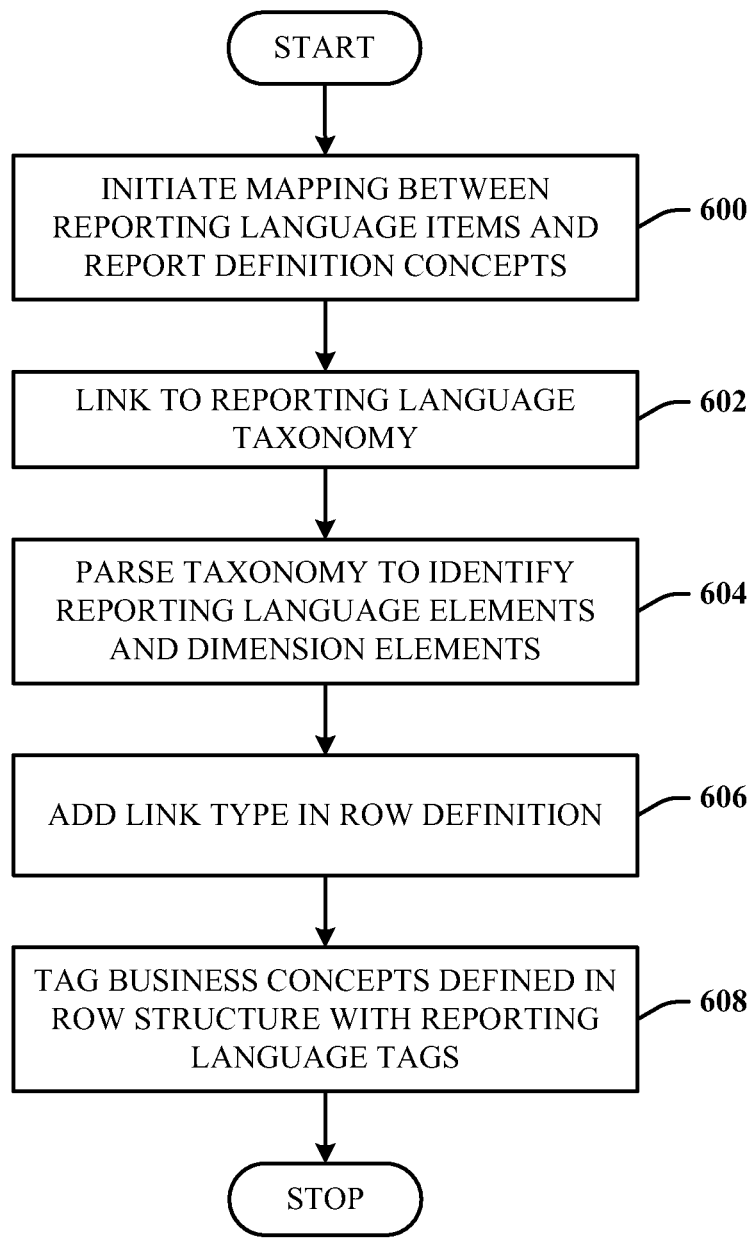
FIG. 6 illustrates a method of mapping dimension concepts to reporting language elements.

FIG. 6 illustrates a method of mapping dimension concepts to reporting language elements. At 600, mapping is initiated between reporting language items and report definition concepts. At 602, as part of this process, a link is made to reporting language taxonomy. At 604, the taxonomy is parsed to identify reporting language elements and dimension elements. At 606, a link type is added to a row definition. At 608, business concepts defined in the row structure are tagged with reporting language tags.

Figure 7:
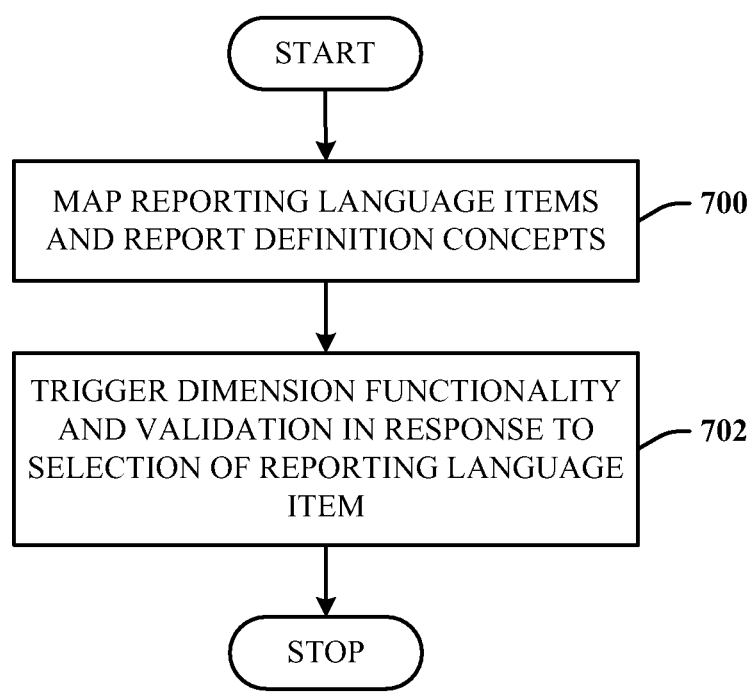
FIG. 7 illustrates a method of validating a hypercube item.

FIG. 7 illustrates a method of validating a hypercube item. At 700, reporting language items and report definition concepts are mapped. At 702, dimension functionality and validation is triggered in response to selection of a reporting language item.

Figure 8:
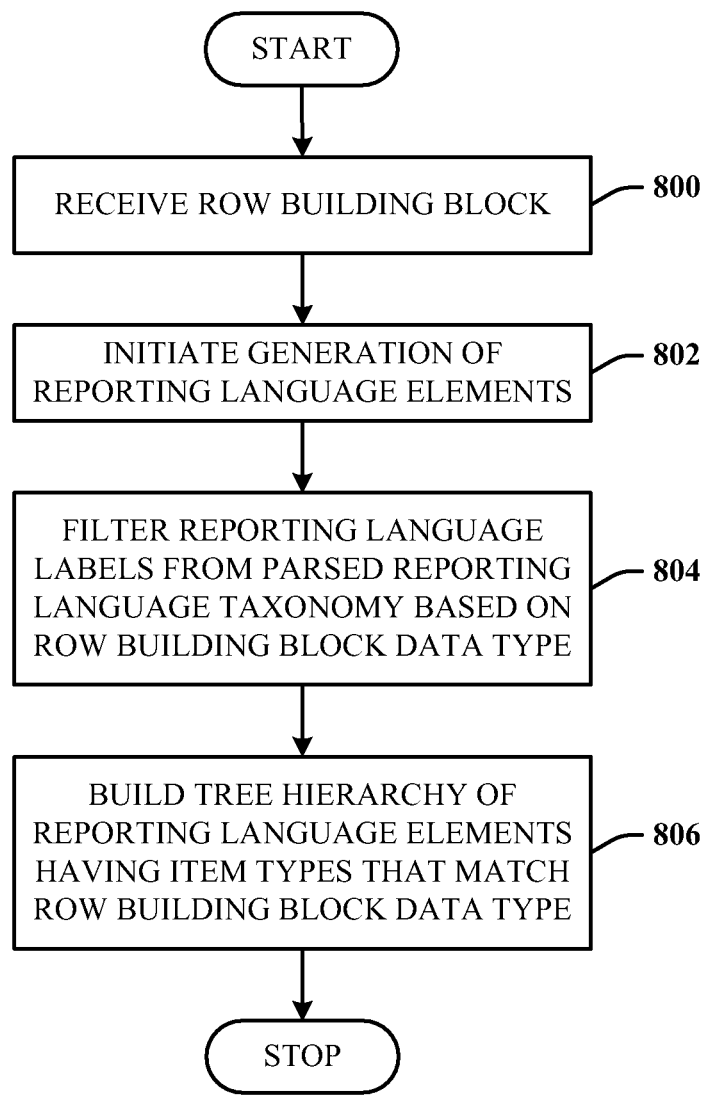
FIG. 8 illustrates a method of creating a reporting language element tree hierarchy.

FIG. 8 illustrates a method of creating a reporting language element tree hierarchy. At 800, a row building block is received. At 802, generation of reporting language elements is initiated. At 804, reporting language elements are filtered from the parsed reporting language taxonomy based on the row building block data type. In other words, if the row building block is for a numeric row, non-numeric items (e.g., text, date/time, Boolean, etc.) is filtered out and only numeric items are presented in the element (e.g., label) tree hierarchy for selection. The displayed hierarchy is built by checking each reporting language (e.g., XBRL) item type against the data type, and only adding the item type to the tree if the item type is of the desired type. At 806, a tree hierarchy of reporting language elements having item types that match the data type is built.

Figure 9:
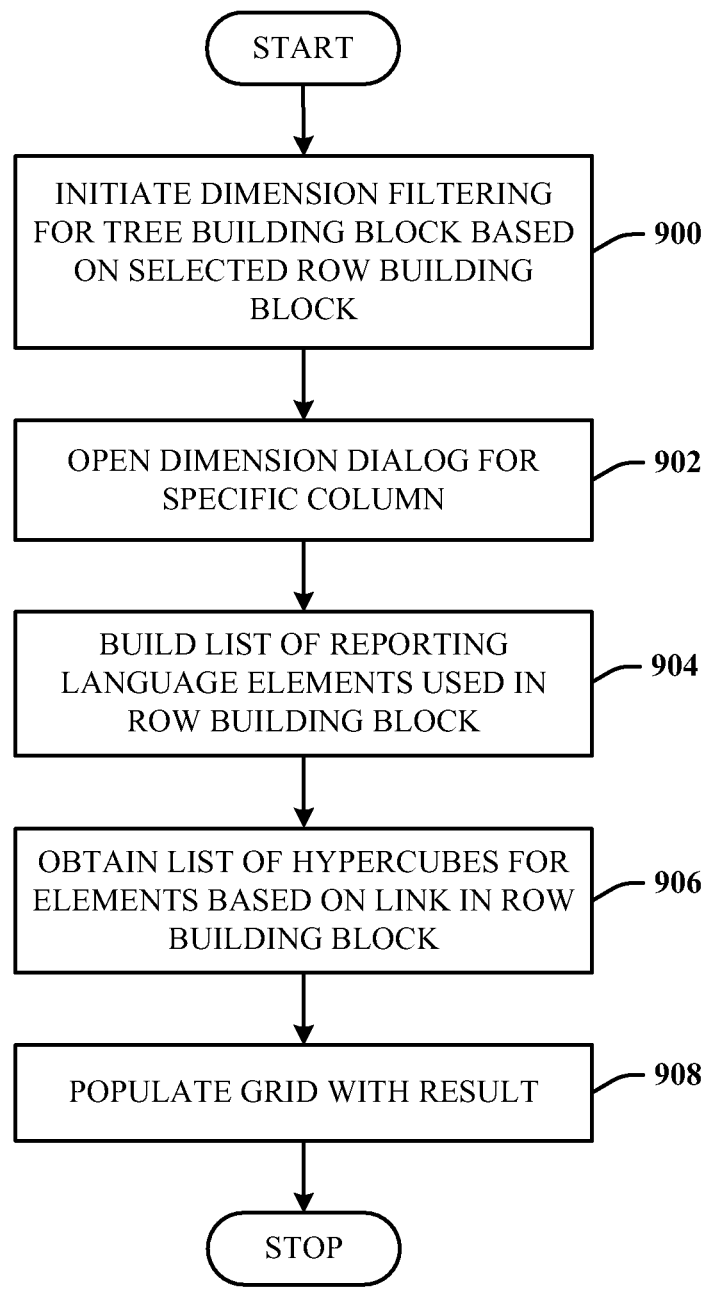
FIG. 9 illustrates a method of filtering for dimensions of a column building block.

FIG. 9 illustrates a method of filtering for dimensions of a column building block. The user builds a row building block and selects reporting language elements for the rows. When the user selects an element (e.g., label), the element, element namespace, and the reporting language presentation link are stored where the element exists (e.g., using a uniform resource identifier (URI) defined in the reporting language taxonomy).

At 900, dimension filtering for a column building block is initiated based on the selected row building block. At 902, a dimension dialog is opened for the specific column. At 904, a list of reporting language elements used in the row building block is built. Each reporting language element is looked up as it exists under the language definition link that corresponds to the language element presentation link (e.g., the presentation defines display hierarchy, whereas the definition defines dimension and hypercube relationships). At 906, a list of hypercubes for the elements is obtained based on the link in the row building block. At 908, the grid is populated with the result. A hypercube is displayed with each of its dimensions indented underneath. For each row that is a dimension, a hierarchy of all of the possible values is built. Those values can be displayed and selected in a Value column in the grid. An alternative to indentation can be the use of icons or some other designation to indicate hypercubes and the hypercube dimensions.

As previously noted, alternatively, the relationships in the taxonomy can be used to retrieve the hypercubes associated with the items from the row building block, instead of the link.

Figure 10:
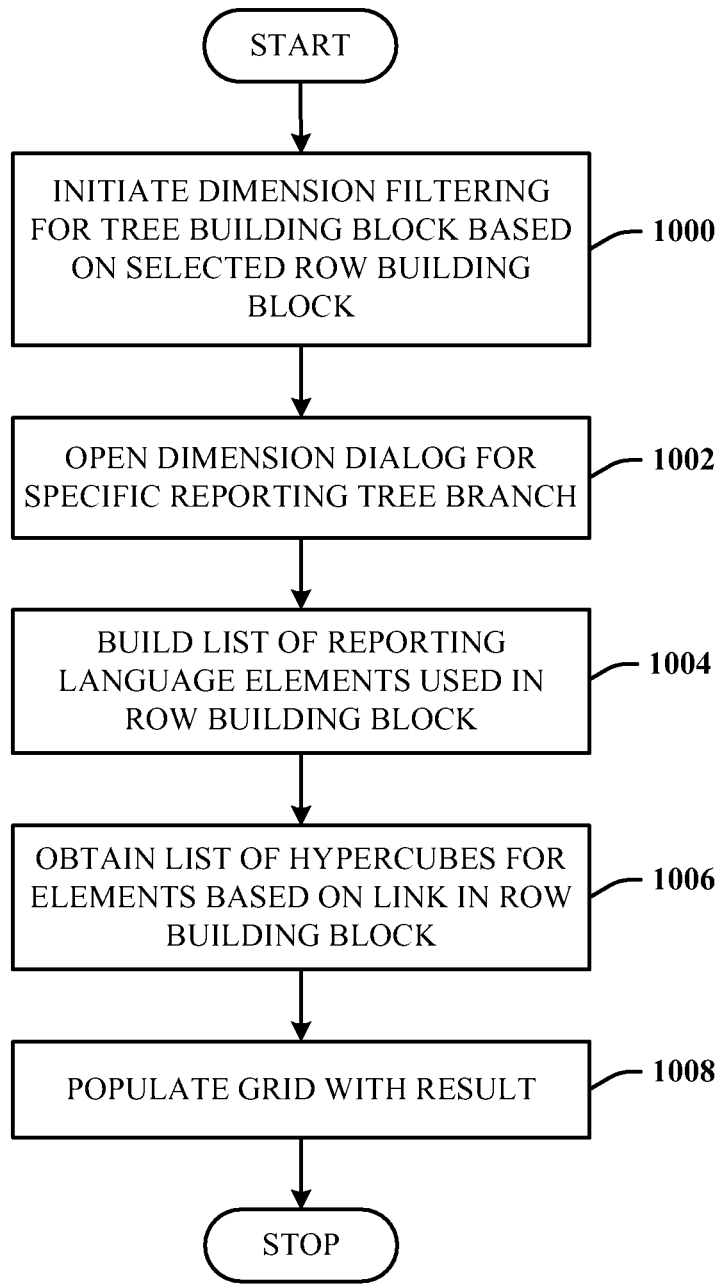
FIG. 10 illustrates a method of filtering for dimensions of a tree building block.

FIG. 10 illustrates a method of filtering for dimensions of a tree building block. The user builds a row building block and selects reporting language elements for the rows. When the user selects an element (e.g., a label), the element, namespace, and the reporting language presentation link are stored where the element exists (e.g., using a URI defined in the reporting language taxonomy).

At 1000, dimension filtering for a tree building block is initiated based on the selected row building block. At 1002, a dimension dialog is opened for the specific tree unit (branch). At 1004, a list of reporting language elements used in the row building block is built. Each reporting language element is looked up as it exists under the language definition link that corresponds to the language element presentation link (e.g., the presentation defines display hierarchy, whereas the definition defines dimension and hypercube relationships). At 1006, a list of hypercubes for the elements is obtained based on the link in the row building block. At 1008, the grid is populated with the result. A hypercube is displayed with each of its dimensions indented underneath. For each row that is a dimension, a hierarchy of all of the possible values is built. Those values can be displayed and selected in a Value column in the grid.

Again, alternatively, the relationships in the taxonomy can be used to retrieve the hypercubes associated with the items from the row building block, instead of the link.

Figure 11:
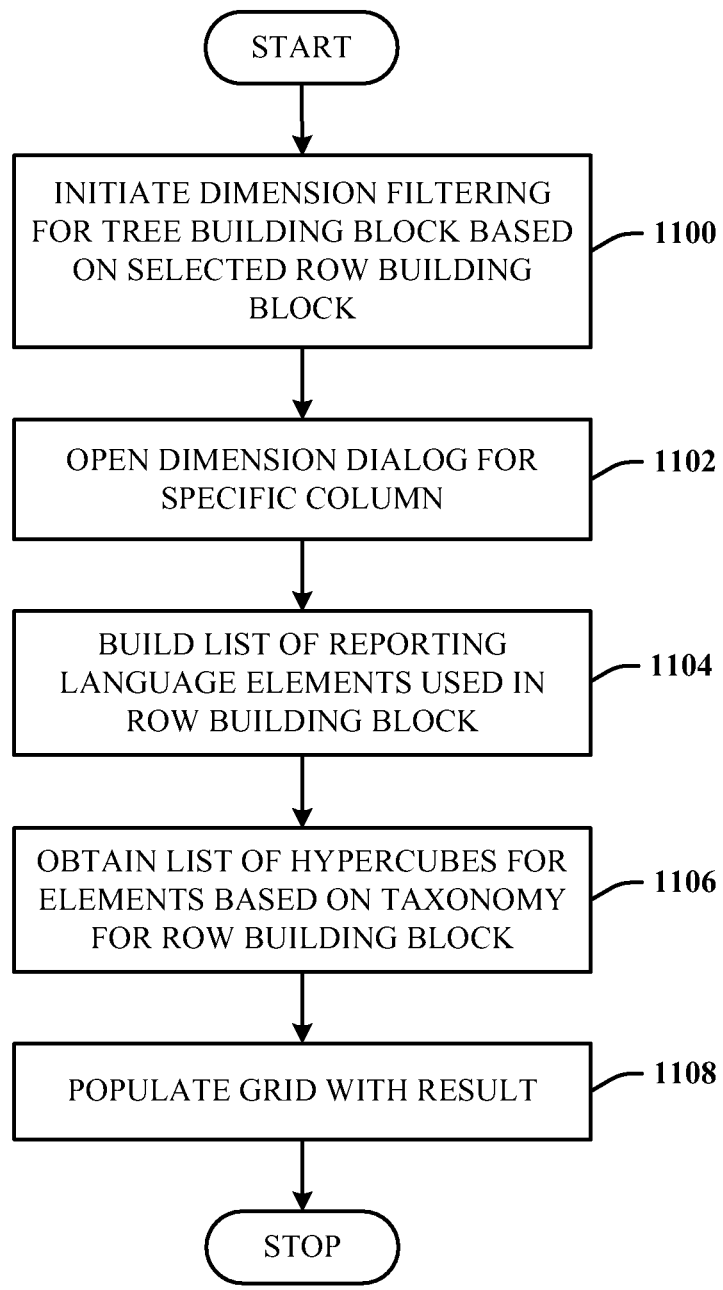
FIG. 11 illustrates a method of filtering for dimensions of a tree building block using element taxonomy.

FIG. 11 illustrates a method of filtering for dimensions of a tree building block using element taxonomy. At 1100, dimension filtering for a column building block is initiated based on the selected row building block. At 1102, a dimension dialog is opened for the specific column. At 1104, a list of reporting language elements used in the row building block is built. At 1106, a list of hypercubes for the elements (e.g., labels) is obtained based on the taxonomy for the row building block. At 1108, the grid is populated with the result. The capability of exploring the element taxonomy to obtain the hypercubes also applies to column building blocks and other building blocks as well.

While certain ways of displaying information to users are shown and described with respect to certain figures as screenshots, those skilled in the relevant art will recognize that various other alternatives can be employed. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
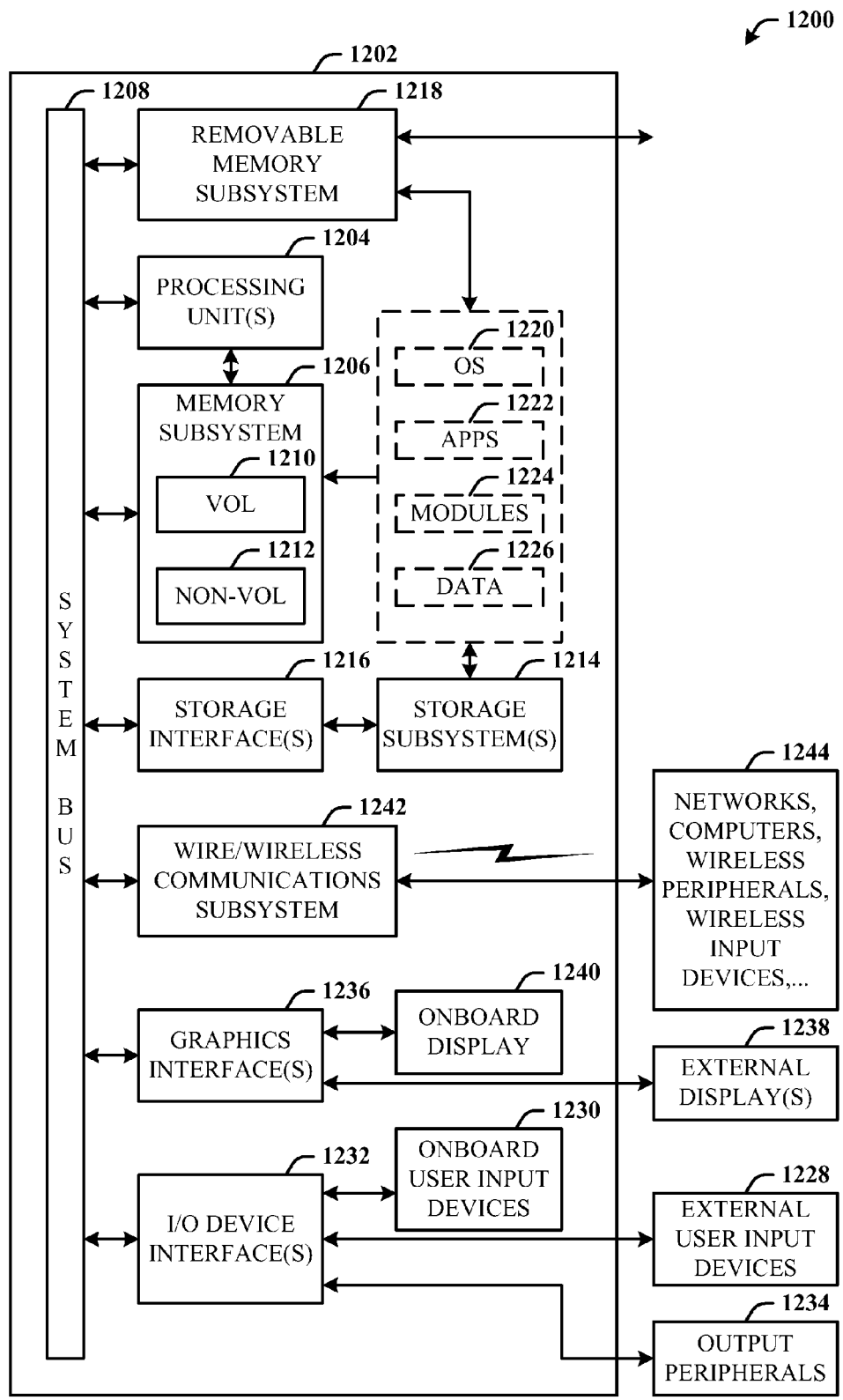
FIG. 12 illustrates a block diagram of a computing system operable to filtering and mapping reporting language information in accordance with the disclosed architecture.

Referring now to FIG. 12, there is illustrated a block diagram of a computing system 1200 operable to filtering and mapping reporting language information in accordance with the disclosed architecture. In order to provide additional context for various aspects thereof, FIG. 12 and the following discussion are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1206 can include volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the memory subsystem 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes storage subsystem(s) 1214 and storage interface(s) 1216 for interfacing the storage subsystem(s) 1214 to the system bus 1208 and other desired computer components. The storage subsystem(s) 1214 can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a removable memory subsystem 1218 (e.g., flash drive form factor technology), and/or the storage subsystem(s) 1214, including an operating system 1220, one or more application programs 1222, other program modules 1224, and program data 1226. Generally, programs include routines, methods, data structures, other software components, etc., that perform particular tasks or implement particular abstract data types.

Where the computer 1202 is a server machines, the one or more application programs 1222, other program modules 1224, and program data 1226 can include the system 100 of FIG. 1, system 200 of FIG. 2, dialogs of FIGS. 3 and 4, and methods of FIGS. 5-10.

All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so forth. Computer readable media can be any available media that can be accessed by the computer 1202 and includes volatile and non-volatile media, removable and non-removable media. For the computer 1202, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP) using logical connections via a wire/wireless communications subsystem 1242 to one or more networks and/or other computers. The other computers can include workstations, servers, routers, personal computers, microprocessor-based entertainment appliance, a peer device or other common network node, and typically include many or all of the elements described relative to the computer 1202. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wire/wireless communication subsystem 1242 (e.g., a network interface adapter, onboard transceiver subsystem, etc.) to communicate with wire/wireless networks, wire/wireless printers, wire/wireless input devices 1244, and so on. The computer 1202 can include a modem or has other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 13:
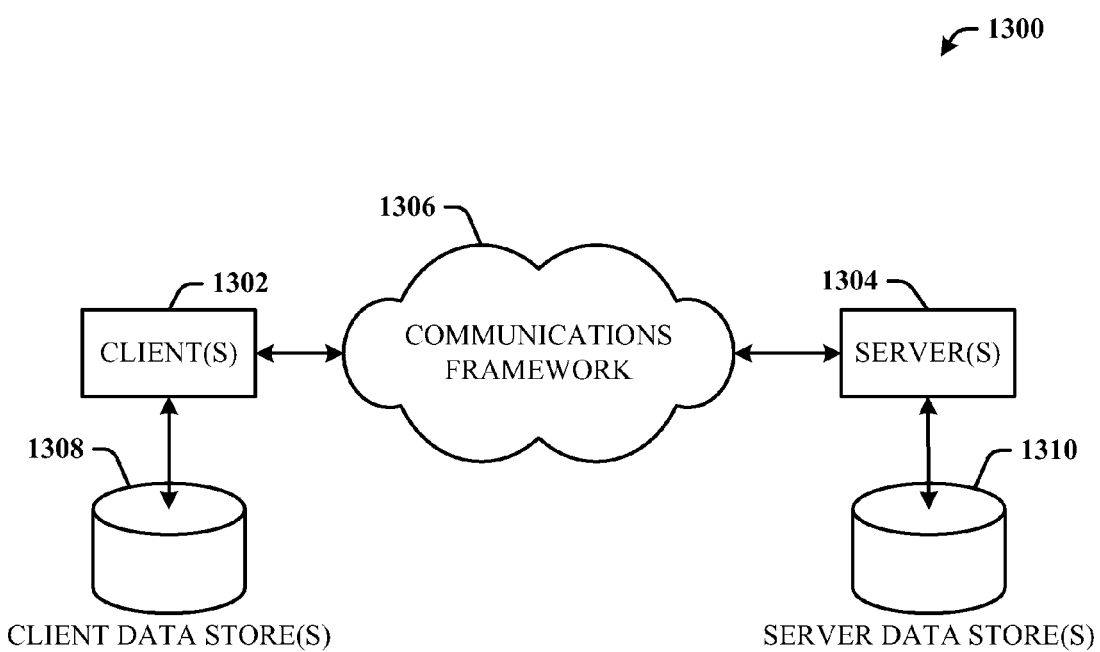
FIG. 13 illustrates a schematic block diagram of a computing environment that can be employed for filtering and mapping for report generation.

Referring now to FIG. 13, there is illustrated a schematic block diagram of a computing environment 1300 that can be employed for filtering and mapping for report generation. The environment 1300 includes one or more client(s) 1302. The client(s) 1302 can be hardware and/or software (e.g., threads, processes, computing devices). The client(s) 1302 can house cookie(s) and/or associated contextual information, for example.

The environment 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented reporting system, comprising:
    building blocks associated with reporting language elements, comprising at least one of a row definition, a column definition, or a tree definition, wherein the building blocks and the associated reporting language elements are an interchangeable and reusable basis for output reports, wherein the building blocks comprise a row building block;
    a report definition, comprising at least one selected building block, configured to retrieve and process basis data into fact data in the output reports, the report definition is utilized to retrieve and process basis data into fact data in a final output report;
    a filter component configured to filter a parsed full reporting language taxonomy and present reporting language elements assigned in the at least one building block included in the report definition;
    a mapping component configured to map the parsed reporting language elements to dimension concepts associated with the at least one building block included in the report definition, wherein the mapping component facilitates association of a column building block to the row building block, and wherein the mapping component facilitates association of a tree building block to the row building block, and wherein the filter component and the mapping component facilitate creation of a hypercube that is presented with row building blocks and possible values for the dimension concepts;
    a reporting engine configured to process the report definition to retrieve and process the basis data into the fact data in the final output report; and
    a processor that executes computer-executable instructions associated with the building blocks, the report definition, the filter component, the reporting engine, and the mapping component.

2. The system of claim 1, wherein the filter component dynamically filters the reporting language elements based on a data type in the building block.

3. The system of claim 1, further comprising a presentation dialog for presenting the filtered language elements as a hierarchy of the reporting language taxonomy.

4. The system of claim 1, wherein the hypercube is generated based on the mapping of the column building block and the tree building block to the row building block.

5. The system of claim 4, wherein the hypercube is validated by ensuring that the mapped dimension concepts are valid for the reporting language elements of the row building block.

6. The system of claim 4, wherein the parsed full reporting language taxonomy is filtered based on a data type of a reporting language element assigned in the row building block.

7. The system of claim 1, wherein the mapping component includes a dimension dialog for assigning a dimension concept to a reporting language element.

8. The system of claim 1, wherein the dimension concepts generated are only valid for a corresponding reporting language element.

9. A computer-implemented method of generating a report, comprising acts of:
    associating building blocks with reporting language elements, the building blocks and the associated reporting language elements are an interchangeable and reusable basis for output reports;
    retrieving and processing basis data into fact data in the output reports, according to a report definition, the report definition comprising at least one selected building block;
    filtering a parsed reporting language taxonomy and presenting reporting language elements assigned in the selected building block;
    mapping one or more dimension concepts to the parsed reporting language elements, wherein the act of mapping facilitates association of a column building block and a tree building block to the row building block, wherein the acts of filtering and mapping facilitate creation of a hypercube that is presented with row building blocks and possible values for the dimension concepts;
    processing the report definition to retrieve and process the basis data into the fact data in the final report output; and
    configuring a processor to execute instructions stored in memory to perform the acts of associating, retrieving, filtering, mapping, and processing.

10. The method of claim 9, further comprising generating the hypercube based on the mapping of the column building block and the tree building block to the row building block.

11. The method of claim 10, further comprising validating the hypercube by ensuring that the mapped dimension concepts are valid for the reporting language elements of the row building block.

12. The method of claim 9, wherein the dimension concepts generated are only valid for a corresponding reporting language element.

13. The method of claim 9, wherein the parsed full reporting language taxonomy is filtered based on data type of reporting language element assigned in the row building block.

14. The method of claim 9, further comprising storing a selected reporting language element, element namespace, and presentation link in a location of the selected reporting language element.

15. The method of claim 9, further comprising presenting a list of hypercubes for corresponding reporting language elements.

16. The method of claim 9, further comprising exposing a dimension selection dialog for a specific column or reporting tree branch.

17. A computer-readable physical hardware storage medium comprising computer-executable instructions that when executed by a hardware processor enables a reporting system, comprising:

building blocks associated with reporting language elements, comprising at least one of a row definition, a column definition, or a tree definition, wherein the building blocks and the associated reporting language elements are an interchangeable and reusable basis for output reports, wherein the building blocks comprise a row building block;

a report definition, comprising at least one selected building block, configured to retrieve and process basis data into fact data in the output reports, the report definition is utilized to retrieve and process basis data into fact data in a final output report;

a filter component configured to filter a parsed full reporting language taxonomy and present reporting language elements assigned in the at least one building block included in the report definition;

a mapping component configured to map the parsed reporting language elements to dimension concepts associated with the at least one building block included in the report definition, wherein the mapping component facilitates association of a column building block to the row building block, and wherein the mapping component facilitates association of a tree building block to the row building block, and wherein the filter component and the mapping component facilitate creation of a hypercube that is presented with row building blocks and possible values for the dimension concepts; and a reporting engine configured to process the report definition and the basis data into the fact data in the final output report.

18. The computer-readable physical hardware storage medium of claim 17, wherein the filter component filters the reporting language elements based on a data type in the row building block.

19. The computer-readable physical hardware storage medium of claim 17, wherein the hypercube is generated based on the mapping of the column building block and the tree building block to the row building block.

20. The computer-readable physical hardware storage medium of claim 17, wherein the hypercube is validated by ensuring that the mapped dimension concepts are valid for the reporting language elements of the row building block.

* * * * *